(12) United States Patent
Wu et al.

(10) Patent No.: US 11,585,917 B1
(45) Date of Patent: Feb. 21, 2023

(54) SYSTEMS AND METHODS FOR GENERATING THREE-DIMENSIONAL MAPS OF AN INDOOR SPACE

(71) Applicant: GOOGLE LLC, Mountain View, CA (US)

(72) Inventors: Shengzhi Wu, Shenzhen (CN); Alexander James Faaborg, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/445,751

(22) Filed: Aug. 24, 2021

(51) Int. Cl.
*G01S 13/89* (2006.01)
*G06T 17/05* (2011.01)
*G01B 21/18* (2006.01)
*G06T 7/55* (2017.01)
*G06V 20/20* (2022.01)
*H04L 67/52* (2022.01)

(52) U.S. Cl.
CPC .............. *G01S 13/89* (2013.01); *G01B 21/18* (2013.01); *G06T 7/55* (2017.01); *G06T 17/05* (2013.01); *G06V 20/20* (2022.01); *H04L 67/52* (2022.05); *G06T 2207/10028* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 2006/0121851 A1* | 6/2006 | Moore | G06K 7/10306 455/73 |
| 2012/0319597 A1* | 12/2012 | Park | H05B 47/125 315/154 |
| 2015/0061859 A1* | 3/2015 | Matsuoka | G08B 25/008 340/501 |
| 2018/0046733 A1 | 2/2018 | Wong | |
| 2019/0180060 A1 | 6/2019 | Mountz | |

(Continued)

FOREIGN PATENT DOCUMENTS

| | | |
|---|---|---|
| CN | 106355647 A | 1/2017 |
| CN | 111174799 A | 5/2020 |

OTHER PUBLICATIONS

"Scan to CAD", Canvas by Occipital Inc.,(https://www.helpscout.com/knowledge-base/?utm_source=docs&utm_medium=footerlink&utm_campaign=Docs+Branding), Feb. 17, 2021, 20 pages.

(Continued)

*Primary Examiner* — Frank S Chen
(74) *Attorney, Agent, or Firm* — Baker Hughes Bellermann LLP

(57) ABSTRACT

Three-dimensional (3D) maps may be generated for different areas based on scans of the areas using sensor(s) of a mobile computing device. During each scan, locations of the mobile computing device can be measured relative to a fixed-positioned smart device using ultra-wideband communication (UWB). The 3D maps for the areas may be registered to the fixed position (i.e., anchor position) of the smart device based on the location measurements acquired during the scan so that the 3D maps can be merged into a combined 3D map. The combined (i.e., merged) 3D map may then be used to facilitate location-specific operation of the mobile computing device or other smart device.

20 Claims, 10 Drawing Sheets

(56) References Cited

U.S. PATENT DOCUMENTS

| | | |
|---|---|---|
| 2019/0296506 A1 | 9/2019 | Mcqueen et al. |
| 2020/0041268 A1 | 2/2020 | Yoshino et al. |
| 2021/0048526 A1* | 2/2021 | Booij .................... G01S 5/0009 |

OTHER PUBLICATIONS

Invitation to Pay Additional Fees for PCT Application No. PCT/US2022/075263, dated Dec. 6, 2022, 10 pages.

* cited by examiner

SYSTEMS AND METHODS FOR GENERATING THREE-DIMENSIONAL MAPS OF AN INDOOR SPACE

FIELD OF THE DISCLOSURE

The present disclosure relates to augmented reality systems and more specifically to a system and method for combining (i.e., merging) three-dimensional (3D) maps generated by multiple scans and using the merged 3D maps for mobile applications.

BACKGROUND

Depth sensing on a mobile device can enable a user to scan an indoor space (e.g., a room) to create a 3D model (i.e., 3D map). The depth sensing may utilize a plurality of sensors including an inertial measurement unit (IMU) to determine orientations and a dedicated depth sensor or camera(s) to determine depths (i.e., ranges) between a mobile computing device and objects in the room as the mobile computing device is physically moved (i.e., scanned) to sense different areas. The 3D maps can be combined with images to generate realistic virtual rooms, which a user can interact with in an immersive and realistic experience (e.g., virtual tour). The 3D models can also be used to generate more realistic virtual objects in an augmented reality (AR) environment. For example, the 3D models may help AR software position virtual objects behind real objects in the indoor space, such as a building or a residence. Scanning the indoor space successfully has multiple requirements and sometimes these requirements are beyond the control of a user. If all of the requirements are not met, a poor scan may result, and the corresponding 3D map may be incomplete and/or distorted. This is especially true when scanning a large indoor space with multiple areas.

SUMMARY

In at least one aspect, the present disclosure generally describes a method for generating a 3D map. The method includes performing a first scan of a first area using a depth sensor of a mobile computing device. The method further includes locating the mobile computing device relative to an anchor position during the first scan using an ultra-wideband (UWB) position sensor of the mobile computing device. The method further includes generating a first 3D map of the first area, where the first 3D map is relative to the anchor position.

In a possible implementation, the method further includes performing a second scan of a second area using the depth sensor of the mobile computing device. The mobile computing device is located relative to the anchor position during the second scan using the UWB position sensor of the mobile computing device so that a second 3D map of the second area can be generated. Like the first 3D map, the second 3D map is relative to the anchor position. The method further includes merging the first 3D map and the second 3D map based on the (common) anchor position.

The first area can be a first room of an indoor space, such as a building or a residence, and the second area can be a second room of the indoor space. The anchor position can be a location in the indoor space at which a smart device (e.g., a smart-home device) is fixedly positioned.

The smart device can be configured for UWB communication with the UWB position sensor of the mobile computing device. Through UWB communication, the range and/or direction of the mobile computing device relative to the smart device may be determined and used to locate (i.e., track) the mobile computing device during the scan. The 3D maps can be spatially arranged to form a third 3D map that covers both areas. The spatial arrangement is possible because both 3D maps are generated (i.e., reconstructed) relative to the anchor position of the smart device in the indoor space.

In another aspect, the present disclosure generally describes a method for controlling an operation of a (movable) smart device based on its location. The method includes generating a merged 3D map. The 3D map includes a first area and a second area scanned by a mobile computing device. The first area and the second area are located in the merged 3D map according to their relative positions to an anchor position, which are determined by UWB communication. The method further includes tagging a plurality of locations in the merged 3D map. The method further includes tracking the smart device based on UWB communication and the merged 3D map, determining that the smart device is at a tagged location in the merged 3D map, and adjusting the operation of the smart device based on the tagged location.

In a possible implementation, boundaries of a building or residence can be identified based on the merged 3D map so that a location outside the boundaries of the building or residence can be tagged. When a smart device is in the location outside the boundaries of the building or residence, its access (e.g., to a network) can be limited.

In another possible implementation, an object can be identified based on images correlated with the merged 3D map so that an area surrounding the object can be tagged. When a smart device enters the area surrounding the object, information may be presented on the smart device. For example, an area around an exercise bike may trigger the smart device to present information relative to a workout on the exercise bike.

In another possible implementation, a room can be identified based on the merged 3D map. Further, the room may be tagged according to a room-type that is determined based on objects identified in images correlated with the merged 3D map. When a smart device enters the room, its playback of media may be controlled (based on the room-type). For example, a bed identified in images may be used to tag the room as a bedroom and the playback on the smart device (e.g., smart speaker) may be made suitable for the bedroom.

In another aspect, the present disclosure generally describes a system for generating a 3D map. The system includes a smart device (e.g., smart-home device) fixedly located at an anchor position and configured for UWB communication. The system further includes a mobile computing device (e.g., mobile phone, tablet, AR glasses). The mobile computing device includes a depth sensor that is configured to gather a first set of depth data corresponding to a first area when the depth sensor is scanned over the first area during a first scan and a second set of depth data corresponding to a second area when the depth sensor is scanned over the second area during a second scan. The mobile computing device further includes a UWB tag that is configured to determine ranges between the mobile computing device and the anchor position during the first scan and the second scan based on UWB communication between the smart device and the UWB tag. The mobile computing device further includes a processor that can be configured by software instructions to perform a 3D mapping method. The 3D mapping method includes registering the first set of depth data to the anchor position based on the ranges between the mobile computing device and the anchor position during the first scan and generating a first 3D map relative to the anchor position based on the registered first set of depth data. The 3D mapping method further includes registering the second set of depth data to the anchor position based on the ranges between the mobile computing device and the anchor position during the second scan and generating a second 3D map relative to the anchor position based on the registered second set of depth data. The 3D mapping method further includes merging the first 3D map and the second 3D map.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

A mobile computing device (e.g., mobile phone, tablet, augmented reality (AR) glasses) may be configured with a depth sensor (i.e., depth camera) that can scan an area (e.g., room, hall, etc.) of an indoor space (e.g., residence, building, office, etc.) to produce a 3D map (i.e., 3D model, 3D scan) of the indoor space. The 3D map is a rendering of the indoor space that includes relative dimensions of objects (e.g., walls, furniture, items) arranged in a spatial relationship that accurately portrays the indoor space. The 3D map may be used directly to obtain an interactive view of the space (e.g., virtual tour). Alternatively, information may be derived from the 3D map to enhance or enable some application (e.g., computer-aided design, augmented reality, etc.).

Figure 1:
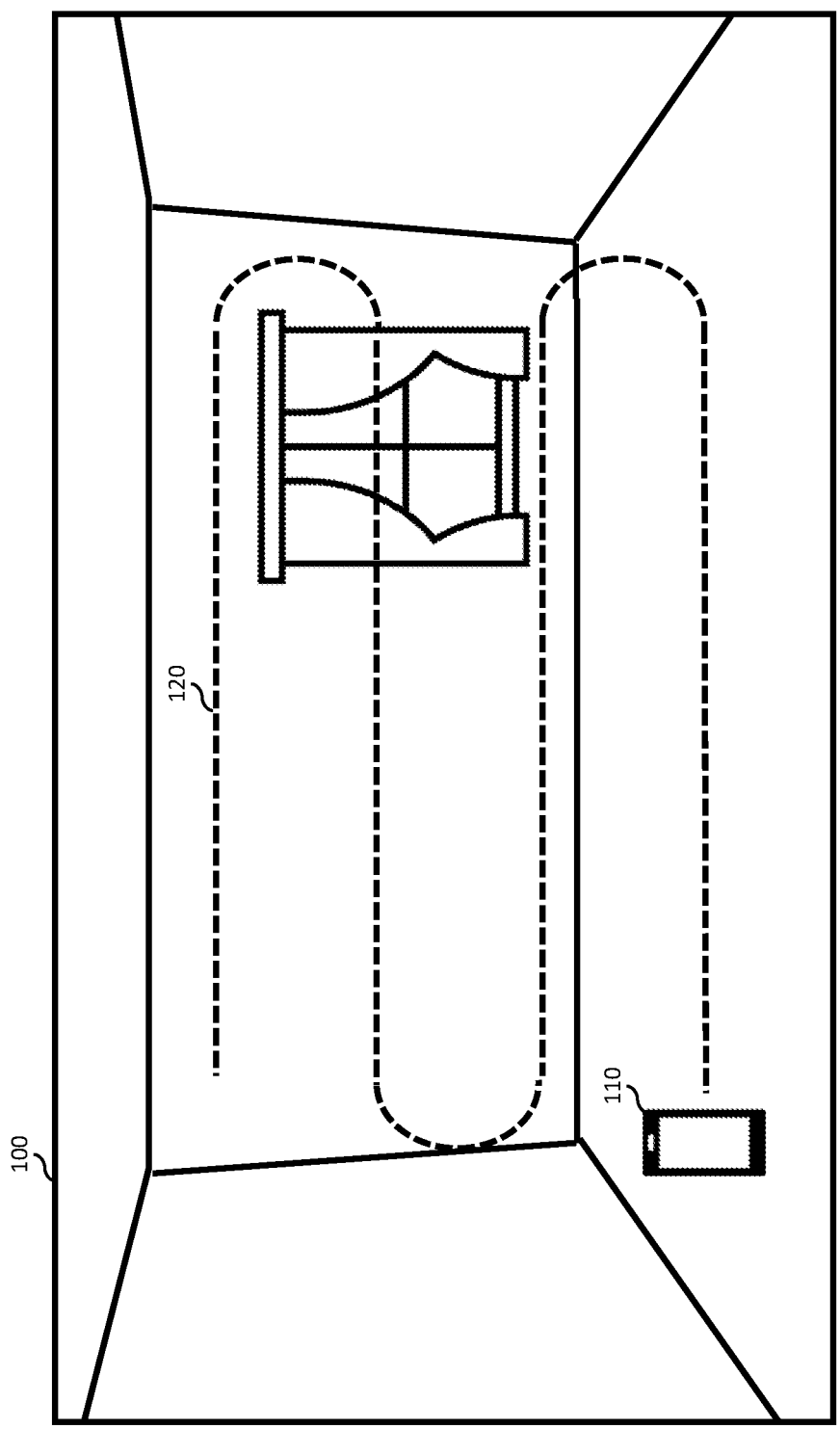
FIG. 1 illustrates a mobile computing device scanning an indoor area to acquire depth data for a 3D map according to a possible implementation of the present disclosure.

As shown in FIG. 1, acquiring the depth data for a 3D map may be accomplished by physically scanning a depth sensor, included in a mobile computing device 110, along a path 120 during a 3D scan of an indoor area 100 to accommodate a depth sensor's limited field-of-view (FOV). The mobile computing device 110 may monitor its position/orientation (e.g., using an inertial measurement unit (IMU) and/or camera) during the 3D scan so that the depth data may be registered to the relative positions/orientation of the mobile computing device during the scan. Because the depth data is relative to the position/orientation of the mobile computing device during the 3D scan and not to any physical coordinate system, it may be difficult to determine the relative positions/orientations of sets of depth data from different 3D scans. Accordingly, it may be difficult to create a 3D map of multiple different areas of an indoor space, and presently most solutions have technical problems.

Creating a 3D map of multiple different areas by scanning the multiple different areas continuously in a single scan may require more processing power and/or memory than is practical, and if the scan is interrupted, then a user might have to restart a lengthy scan process. Creating a merged 3D map of multiple areas by scanning the multiple areas separately (i.e., in multiple scan sessions) and then merging the 3D maps can require the 3D maps to have overlapping regions to determine their relative position/orientation. Acquiring and registering these overlapping regions may be difficult for a few reasons. First, acquiring usable overlapping regions may be difficult if the overlapping regions lack recognizable landmarks, which are not always available. Second, acquiring usable overlapping regions may be difficult if a user improperly scans the overlapping regions, which places added requirements on a user. Even when usable overlapping regions are acquired, it may still be difficult to register them automatically because of the processing required, and manually merging the 3D maps based on the overlapping regions can be time consuming.

The disclosed systems and methods provide a technical solution for creating 3D maps of multiple areas of an indoor space by acquiring location data (i.e., position data) during each 3D scan so that each 3D scan is registered (or can be registered) to a physical location (i.e., anchor position) in the indoor space, and then, merging the 3D maps based on their common anchor position (i.e., anchor point). The disclosed anchor position can be the location of a smart device, such as a smart-home device (e.g., smart speaker, hub-device, smart thermostat, etc.), that is not typically moved or that is permanently installed (i.e., fixedly positioned). The location data can be acquired by location tracking based on ultra-wideband (UWB) communication between a mobile computing device performing the scan and the smart device. The disclosure further describes possible technical opportunities for gathering information from a merged 3D map and using the merged 3D map for mobile applications, including augmented reality.

Figure 2:
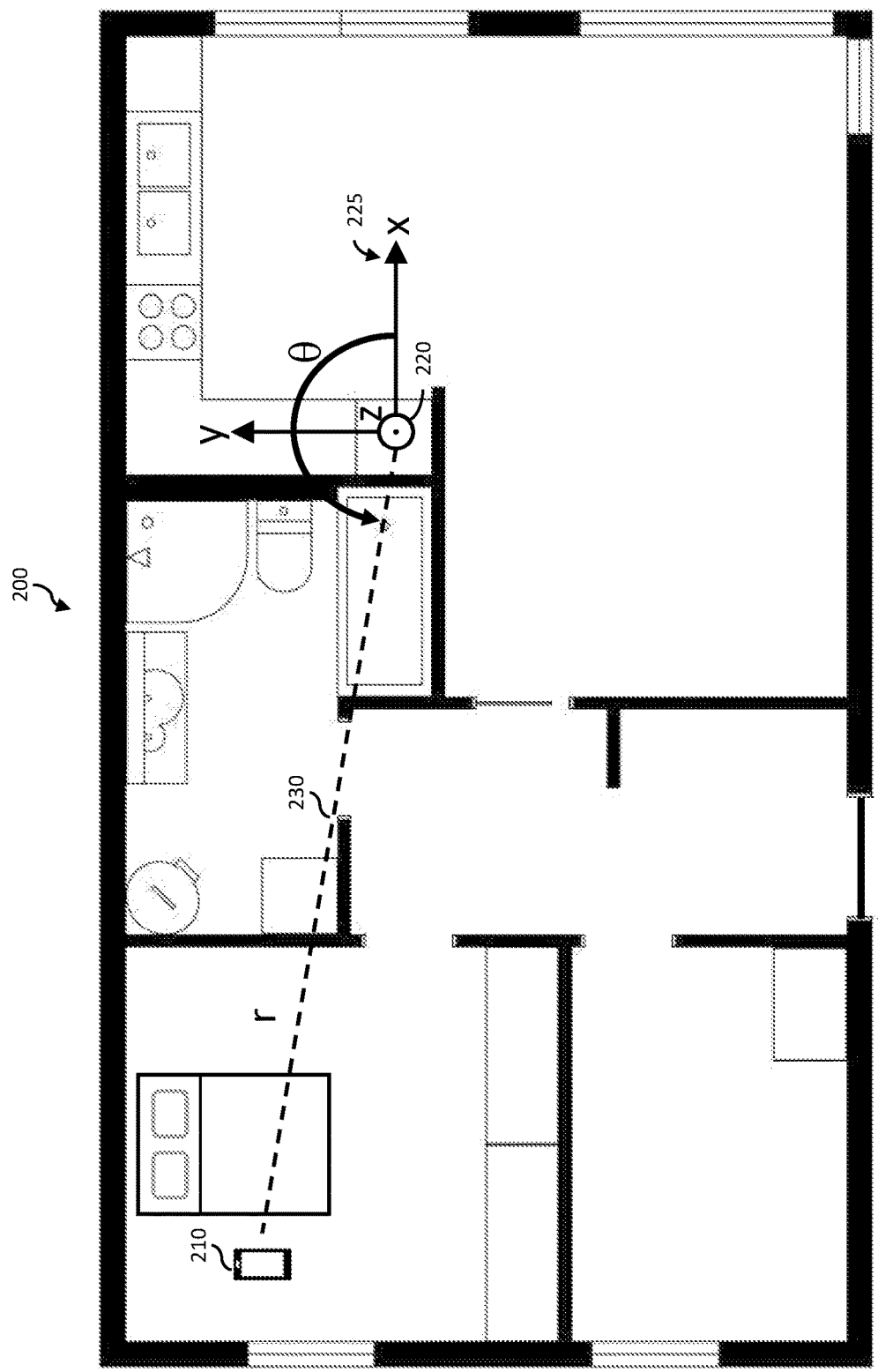
FIG. 2 is a plan view of an indoor space including a mobile computing device and a smart device configured in an indoor position system.

FIG. 2 is a plan view of an indoor space including a mobile computing device and a smart device configured as an indoor positioning system (IPS). While only the mobile computing device and the smart device are shown, it should be noted that the IPS may be implemented using a variety of configurations of a variety of possible devices for a variety of possible applications. Presently, one possible implementation of the location/tracking of a mobile computing device 210 during a 3D scan by a smart device 220 fixedly located at an anchor position will be described.

As shown in FIG. 2, a mobile computing device 210 may be moved within an area (i.e., bedroom) of the indoor space 200, while the smart device 220 remains located at a fixed location. As shown, the smart device is located at the anchor position. The anchor position may be within the indoor space 200 or outside the indoor space 200. For example, a smart device in a neighboring indoor space (not shown) may be used as an anchor point.

The mobile computing device 210 and the smart device 220 are configured to communicate over a UWB communication link 230. The UWB communication between these devices may be used to locate and track a position (i.e., location) of the mobile computing device 210 relative to the smart device 220. For example, the mobile computing device 210 may locate and track its position relative to the smart device during a 3D scan of the area.

The mobile computing device 210 and the smart device 220 may each include at least one UWB tag (i.e., UWB module). The UWB tag can be configured to transmit and receive information via UWB communication. The information may be used to determine a relative position of the mobile computing device 210 and/or the smart device 220, and when a UWB tag is configured to output a relative position it may be referred to as a UWB position sensor. The relative position may be determined by a UWB position sensor using various approaches.

The UWB position sensor (i.e., UWB sensor) may determine a range (r) between the mobile computing device 210 and the smart device 220 based on UWB communication. For example, the range (r) may be based on a roundtrip time (RTT) taken for information (e.g., a handshake) to be exchanged between the mobile computing device 210 and the smart device 220. In some implementations the UWB position sensor may determine an angle ($\theta$) as well as the range (r). The angle may be relative to a fixed coordinate system 225 (x, y, z) that can be located at the anchor position (as shown in FIG. 2) or at a known position offset from the anchor position. Determining the angle ($\theta$) may be based on a time difference of arrival (TOA). A UWB position sensor may be configured with multiple antennas arranged in an array so that each of the multiple antennas receives a UWB signal at a different time. By computing the time difference of arrival, an incident angle of the UWB signal, corresponding to the angle ($\theta$) may be determined. These measurements may further include steps to remove multipath signals and can be extended into other dimensions (i.e., planes). For example, UWB communication may help to determine a relative elevation between the two devices (not shown).

In some implementations, the IPS includes multiple smart devices (i.e., multiple anchor positions). Accordingly, the UWB communication may include smart device identification information (i.e., device ID) so that the mobile computing device 210 can determine the proper relative location to each smart device. The use of multiple smart devices may also allow triangulation based on the ranges between the mobile computing device and each smart device. Additionally, the use of multiple smart devices may allow for detection of a movement of a smart device. For example, each smart device may monitor locations of other smart devices, and a movement of a smart device may trigger the smart device to update/modify its location and/or update/modify its device ID.

Figure 3:
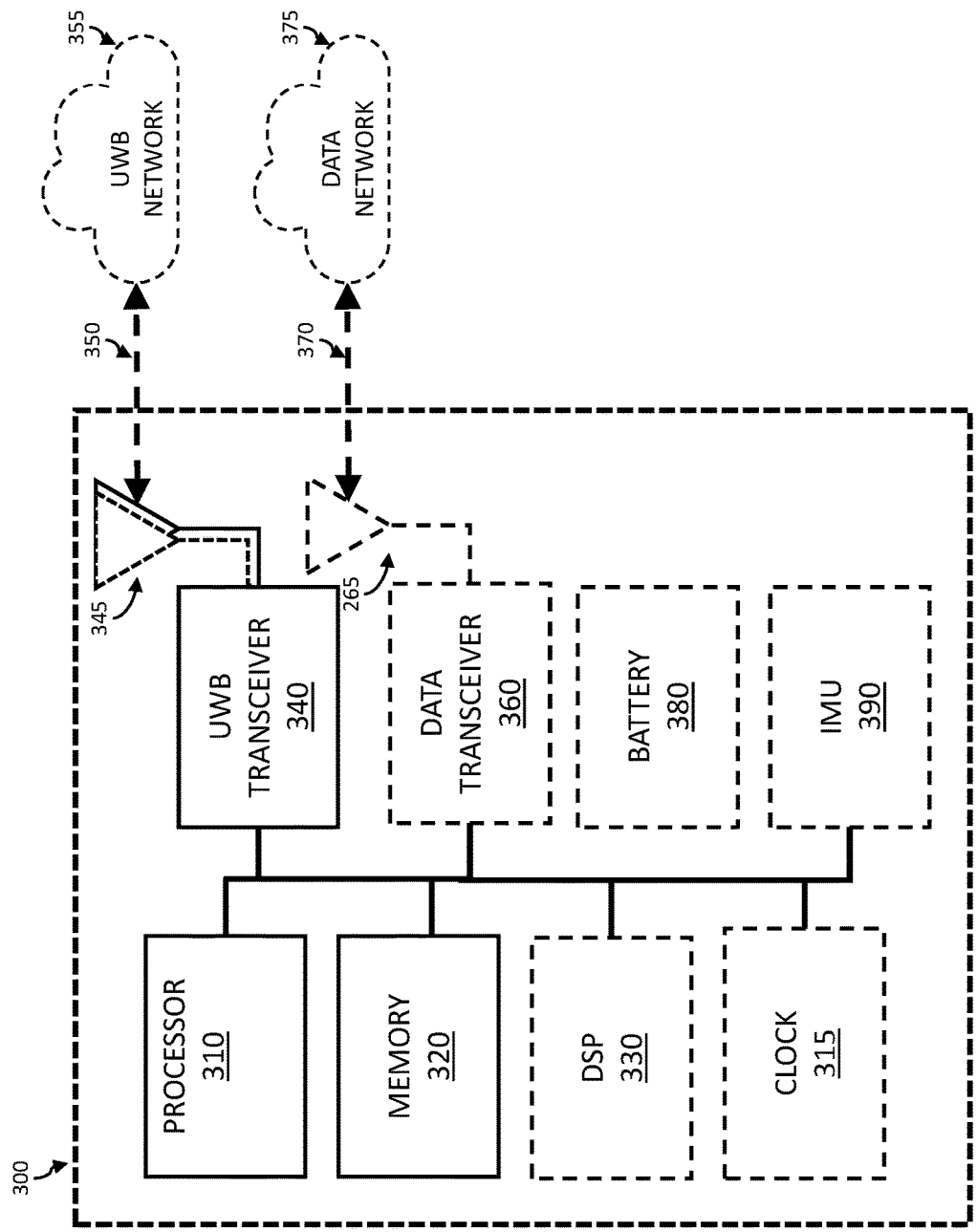
FIG. 3 is a block diagram of an ultra-wideband tag according to a possible implementation of the present disclosure.

FIG. 3 is a block diagram of a UWB tag according to a possible implementation of the present disclosure. The UWB tag shown can be integrated as part of the mobile computing device and/or the smart device (i.e., non-unitary implementation) or as a stand-alone device coupled to the mobile computing device and/or the smart device (i.e., unitary implementation). In unitary implementations, the UWB tag 300 can include a processor 310. The processor 310 may be configured to perform operations (e.g., ranging, positioning) according to software instructions. The software instructions (i.e., software, code, etc.) may be stored on, and retrievable from, a memory 320 (e.g., a non-transitory computer readable memory). The processor 310 may be communicatively coupled to the memory 320 and configured to retrieve the software for execution and to read/write information resulting from the execution of the software. For example, data regarding round-trip times, ranges, angles, positions, etc. may be stored on (and retrieved from) the memory 320. When the UWB tag 300 is integrated as part of the mobile computing device or smart device (i.e., non-unitary implementation), the processor 310 may be implemented as a central processing unit (CPU) of the mobile computing device or smart device. For example, components configured to provide a UWB tag function in AR glasses may utilize a central processing unit of the AR glasses.

The UWB tag 300 may further include a clock 315 implemented in hardware (e.g., logic circuits) or software (e.g., cycle counter). The clock 315 may control the timing of the digital processing and can serve as a timestamp, which may be useful for computing timing (e.g., a period, an interval) of events. The events may correspond to communication of the UWB tag 300 (e.g., round-trip times), or other events associated with a handshake protocol of UWB communication.

The UWB tag 300 may further include a digital signal processor (DSP 330) that is configured to aid or replace the processor for certain functions. For example, the DSP may be configured to carry out aspects regarding the communication (e.g., packet formation, signal identification, etc.) between UWB tags. The processor 310 and/or the DSP 330 may configure a UWB transmitter/receiver (i.e., UWB transceiver 340) to communicate signals over a UWB communication link 350 via UWB antenna(s) 345. The signals may correspond to a UWB protocol, which can include a handshake operation (i.e., handshake protocol). The UWB communication link 350 may serve as a communication channel for a UWB network 355 that includes multiple UWB tags. In some implementations, processing may be shared by the multiple UWB tags. In these implementations, the UWB communication link 350 may serve to relay partially processed information between the UWB tags.

The UWB tag 300 may further include a data transceiver 360 (e.g., Bluetooth transceiver, WiFi transceiver, 5G transceiver, etc.) that can be configured by the processor 310 and/or DSP 330 to communicate signals over a data communication link 370 via a data antenna 365. The data communication link 370 may serve as a communication channel for a data network other than the UWB network. For example, the data communication link 370 may be a Bluetooth communication link configured to allow one or more UWB tags in a UWB network 355 to communicate with a mobile computing device via Bluetooth communication. In other words, one or more of the UWB tags may be part of (i.e., communicating with) a data network 375 (e.g., WiFi network, CDMA network, Bluetooth network) in addition to being part of (i.e., communicating with) a UWB network 355. This additional data communication link 370 may be thought of as a port for another device (e.g., AR device, VR device, mobile phone, tablet, etc.) to communicate with the UWB tag 300. This port may be useful in implementations where the other device is configured to perform a portion of the processing necessary for positioning or in implementations where the other device is configured to receive the result of the position (e.g., for an AR application, for a VR application, etc.).

The UWB tag 300 may further include an inertial measurement unit (IMU 390). The IMU 390 may include one or more accelerometers and magnetometers configured to measure movement and orientation of the UWB tag 300. For non-unitary implementations the IMU 390 may be an IMU of the mobile computing device or the smart device. For example, components to provide a UWB tag function in AR glasses may utilize an IMU of the AR glasses.

The UWB tag 300 may further include a power source, such as a battery 380 (e.g., rechargeable battery), to electrically energize the components for function. For non-unitary implementations, the battery may be a battery for the mobile computing device or the smart device. For example, components to provide a UWB tag function in AR glasses may be powered by the battery of the AR glasses rather than a battery dedicated to a UWB tag.

Returning to FIG. 2, the UWB position data can be stored with the 3D scan data (e.g., depth data) collected by the mobile computing device 210 and used to reconstruct a 3D map that is registered to the fixed coordinate system 225. Because the mobile computing device may be used to take multiple scans at various time and may use various smart devices as anchor points, there may be a variety of ways to identify, store, and merge data to generate a 3D map of multiple areas (e.g., rooms) in the indoor space 200.

Figure 4:
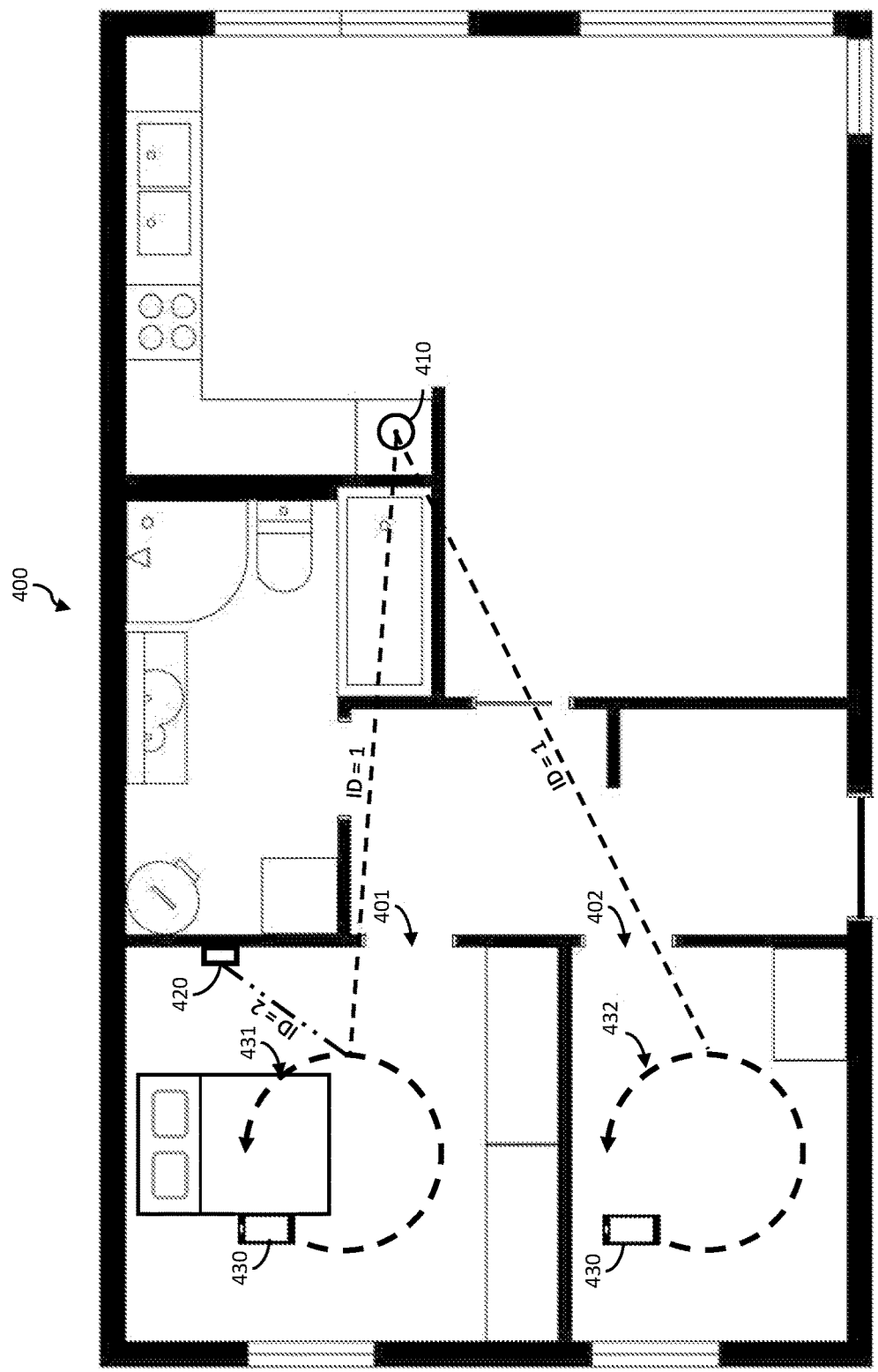
FIG. 4 illustrates a possible 3D scanning scenario for an indoor space according to a possible implementation of the present disclosure.

FIG. 4 illustrates a possible 3D scanning scenario for an indoor space. While the scanning scenario shown will be described in detail to explain aspects of the disclosure, obvious variations to this scanning scenario, and other possible scanning scenarios, may be understood as being within the scope of the disclosed technology. As shown in FIG. 4, the indoor space 400 includes a first smart device 410 (e.g., smart-home hub) located at a first anchor position and a second smart device 420 (e.g., smart-home thermostat) located at a second anchor position. A mobile computing device 430 is configured to make 3D scans of areas (e.g., rooms) in the indoor space 400. The 3D scans may be part of a mapping process in which the user participates or may be part of another process (e.g., AR game) in which the user does not need to participate. The mobile computing device 430 is further configured to determine its position relative to the first smart device 410 and relative to the second smart device 420. Accordingly, the 3D scans may generate 3D maps registered to the first anchor position (i.e., the first smart device 410) and/or the second anchor position (i.e., the second smart device 420).

3D maps registered to the same anchor position may be merged to form a merged 3D map that includes more information. For example, a merged 3D map may include (i) a first room of the indoor space scanned during a first 3D scan and (ii) a second room of the indoor space scanned during a second 3D scan. The merging of registered 3D maps may also allow for partial 3D maps to be generated at different times and then merged together over time to form a more complete 3D map. For example, a merged 3D map may include (i) a first partial 3D scan of the first room scanned during a first scan and (ii) a second partial 3D scan of the first room scanned during a second scan. In other words, a merged 3D map can include more area and/or more detail than each of its constituent maps.

As illustrated in FIG. 4, a mobile computing device 430 makes a first 3D scan 431 of a first room (i.e., bedroom 401) of the indoor space 400. During the first 3D scan 431, the mobile computing device 430 gathers relative position data based on UWB communication with the first smart device 410, as described above. This position data can be identified as relative to the first anchor position by an identifier (i.e., ID) associated with the first smart device 410.

During the first 3D scan, the mobile computing device 430 can also gather relative position data based on UWB communication with the second smart device 420, as described above. This position data can be identified as relative to the second anchor position by an ID associated with the second smart device 420.

At a different time, the mobile computing device 430 makes a second 3D scan 432 of a second room (i.e., office 402) of the indoor space 400. During the second 3D scan 432, the mobile computing device 430 gathers relative position data based on UWB communication with the first smart device 410, as described above. This position data can be identified as relative to the first anchor position by an ID associated with the first smart device 410.

Figure 6:
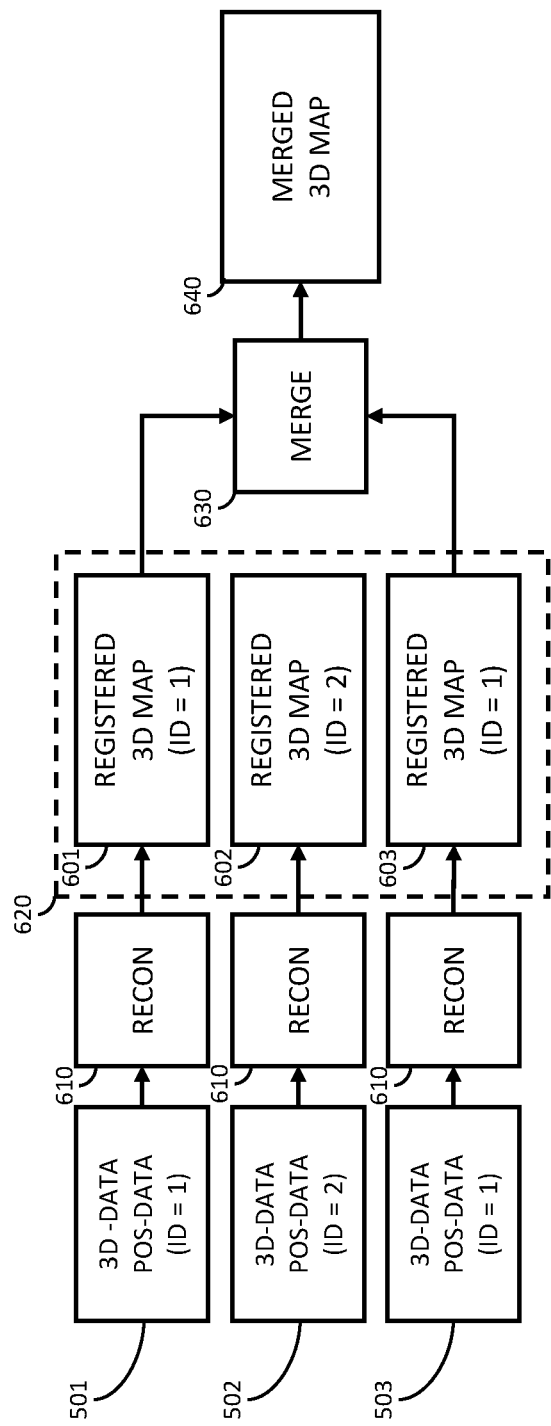
FIG. 6 is a flowchart illustrating a second possible method for generating a merged 3D map from the 3D scanning scenario illustrated in FIG. 4.
Figure 7:
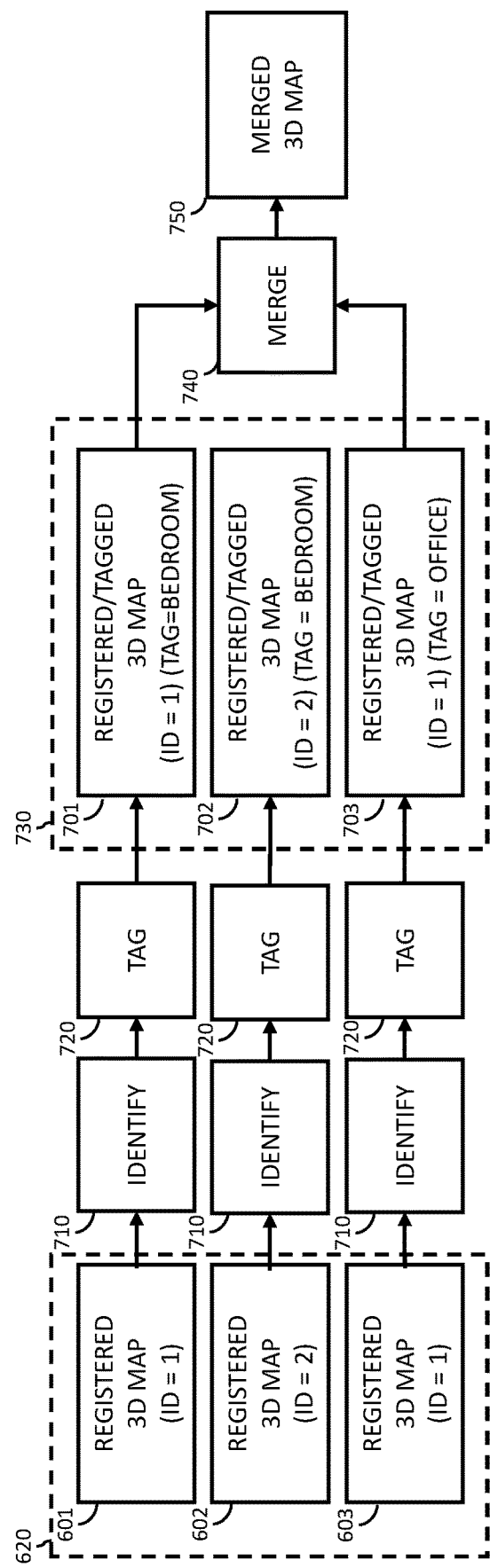
FIG. 7 is a flowchart illustrating a third possible method for generating a merged 3D map from the 3D scanning scenario illustrated in FIG. 4.

Each 3D scan results in 3D scan data that can include some combination of IMU data, camera data, and/or depth sensor data. The 3D scan data may be associated with UWB position data (i.e., position data, UWB data) than can include distances and/or directions relative to an anchor position. The position data can be identified by its ID (e.g., device ID) to indicate an anchor position. Some possible methods for reconstruction and merging the scan/position data to generate a merged 3D map from the example scenario shown in FIG. 4 are illustrated in FIGS. 5-7 and described next.

Figure 5:
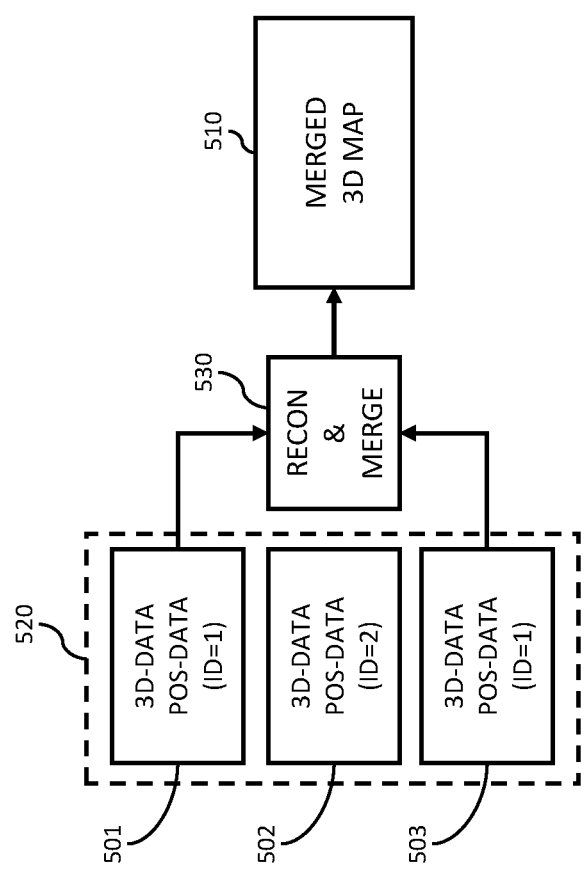
FIG. 5 is a flowchart illustrating a first possible method for generating a merged 3D map from the 3D scanning scenario illustrated in FIG. 4.

FIG. 5 is a flowchart illustrating a first possible method for generating a merged 3D map from the 3D scanning scenario illustrated in FIG. 4. As described above, the first 3D scan results in a first data set 501 that includes 3D scan data (i.e., 3D-DATA) of the bedroom 401 and position data relative to the first smart device 410 (i.e., POS-DATA (ID=1)). The first 3D scan also results in a second data set 502 that includes 3D scan data (i.e., 3D-DATA) of the bedroom 401 and position data relative to the second smart device 420 (i.e., POS-DATA (ID=2)). In this example, the 3D scan data of the first data set 501 and the second data set 502 are the same (i.e., result from the same scan) but in practice they could be different. For example, two 3D scans of the bedroom 401 could be acquired, a first 3D scan of the bedroom at a first time based on the first anchor position and a second 3D of the bedroom scan at a second time based on the second anchor position.

As described above, a 3D scan of the office 402 results in a third data set 503 that includes 3D scan data (i.e., 3D-DATA) of the office 402 and position data relative to the first smart device 410 (i.e., POS-DATA (ID=1)). The first data set 501, the second data set 502, and the third data set 503 may be stored in a memory 520 for a later reconstruction and merging. The memory may be a local memory of the mobile computing device. Alternatively, the memory may be a remote memory (e.g., cloud memory) that the mobile computing device can access via a network. In this implementation, the data from each 3D scan is stored without being reconstructed into a 3D map. In other words, the raw data for each scan is stored without being reconstructed into a 3D map. This approach may have an advantage in simplicity because the data stored is in a raw state and may be reconstructed and merged as needed.

As shown in FIG. 5, the method further includes a reconstruction (i.e., RECON) and merging (i.e., MERGE) process 530 in which the raw data is converted into a merged 3D map. The reconstruction/merging process 530 can include searching the data sets (i.e., metadata of the data sets) for data sets that share a coordinate system (i.e., that have position data from a common anchor point). For example, as shown, the reconstruction and merging process 530 operates on the first data set 501 and the third data set 503 because the position data for each has the same identifier (ID=1). The output of the reconstruction and merging process 530 is a merged 3D map 510 that represents the bedroom 401 and the office 402 as they are spatially arranged and oriented in FIG. 4. The merged 3D map 510 may be in a 3D format (e.g., obj). The merged 3D map may or may not include meta data that identifies the anchor position used for merging.

FIG. 6 is a flowchart illustrating a second possible method for generating a merged 3D map from the 3D scanning scenario illustrated in FIG. 4. The first data set 501, the second data set 502 and the third data set 503 are each applied to a 3D reconstruction algorithm 610. A reconstruction (i.e., RECON) of the first data set 501 results in a first registered 3D map 601 of the bedroom 401 with data registered to the first anchor point. Accordingly, the first registered 3D map 601 has an associated ID (i.e., ID=1) to indicate what coordinate system (i.e., anchor position) the 3D map is registered to (i.e., the first smart device 410). A reconstruction of the second data set 502 results in a second registered 3D map 602 of the bedroom 401 with data registered to the second anchor point. Accordingly, the second registered 3D map 602 has an associated ID (i.e., ID=2) to indicate what coordinate system (i.e., anchor position) the 3D map is registered to (i.e., the second smart device 420). A reconstruction of the third data set 502 results in a third registered 3D map 603 of the office 402 with data registered to the first anchor point. Accordingly, the third registered 3D map 603 has an associated ID (i.e., ID=1) to indicate what coordinate system (i.e., anchor position) the 3D map is registered to (i.e., the first smart device 410).

The first registered 3D map 601, the second registered 3D map 602, and the third registered 3D map 603 may be stored in a memory 620 for a later use and/or merging. The memory may be a local memory of the mobile computing device. Alternatively, the memory may be a remote memory (e.g., cloud memory) that the mobile computing device can access via a network. In this implementation, usable 3D maps are stored and identified for possible later merging. This approach may have an advantage in usability and versatility because the stored registered 3D maps are usable as individual maps and can be merged as needed. The reconstruction and storage of each registered 3D map may occur at a different time so that registered maps of areas may be accumulated in storage over time.

The method further includes a merging (i.e., MERGE) process 630 in which the registered 3D maps are combined to generate a merged 3D map 640. The merge process 630 may include checking identifiers for the registered maps, merging registered 3D maps that have the same identification, and not merging registered 3D maps that do not have the same identification. As shown in FIG. 6, the first registered 3D map 601 and the third registered 3D map 603 are merged 630 because they both have the same identifier (i.e., ID=1).

The data for each registered 3D map may include 3D points and/or a 3D mesh (e.g., wireframe) created from 3D points. The 3D points may be mapped to the coordinate system defined by the anchor position. In some implementations, the registered 3D maps include images of an area. For example, images of the area can be rendered on a 3D surface representing the area.

FIG. 7 is a flowchart illustrating a third possible method for generating a merged 3D map from the 3D scanning scenario illustrated in FIG. 4. The first registered 3D map 601, the second registered 3D map 602, and the third registered 3D map 603 stored in a memory 620 can include images of respective areas. Accordingly, the method may include an identifying process 710 to analyze the 3D map images for additional information about the area. This additional information may include characteristics of the area (e.g., size, shape, color, configuration, etc.) and/or objects in the area (e.g., appliances, furniture, equipment, etc.). The identifying process may use image recognition algorithms to recognize this information. The method may further include associating the recognized information with a tag that describes the area. For example, image analysis of the first registered 3D map 601 may identify a bed in the bedroom 401. The image analysis may be performed automatically, which can advantageously eliminate a responsibility of a user to accurately tag an area when 3D mapping. Accordingly, the first registered 3D map 601 registered map may be tagged as a bedroom. After tagging, a first registered/tagged 3D map 701 is tagged as the bedroom (i.e., TAG=BEDROOM), a second registered/tagged 3D map 702 is tagged as the bedroom (i.e., TAG=BEDROOM), and a third registered/tagged 3D map 703 is tagged as the office (i.e., TAG=OFFICE). The registered and tagged 3D maps may be stored in a memory 730 that is local or remote (e.g., cloud) to the mobile computing device. The method further includes a merging (i.e., MERGE) process 740 in which the registered/tagged 3D maps are combined to generate a merged 3D map 750. As shown in FIG. 6, the first registered/tagged 3D map 701 and the third registered/tagged 3D map 703 are merged 740 because they both have the same identifier (i.e., ID=1). The result of the merging is a merged 3D map 750 that includes the tagged areas. While the merging may require the registered 3D maps to have the same identifier, it may be possible for some of the registered 3D maps in the merged 3D to not be tagged.

A merged 3D map may be used in a variety of applications. A merged 3D map may be used without significant change for visualization of an indoor space. For example, the merged 3D map may be presented as part of a 3D tour of the indoor space or to help generate realistic virtual objects in an AR application, such as AR cloud anchors, which can add persistent virtual objects to an AR scene that multiple users can observe/interact with from different observation points (or the same observation point) at different times (or at the same time). A merged 3D map may also be used as the basis for a measurement and/or design. For example, the merged 3D map may be used for site surveying and creating computer aided designed (CAD) models. A merged 3D map may also help applications that utilize indoor positioning to provide added function, especially when the merged 3D map includes tagged areas/locations.

The indoor positioning system (IPS) described previously may be used for applications other than 3D mapping. These applications may be further enhanced by correlating the positioning data collected with a merged 3D map. For example, operation of a smart device may be adjusted based on its tracked location within a merged 3D map of the area.

Figure 8:
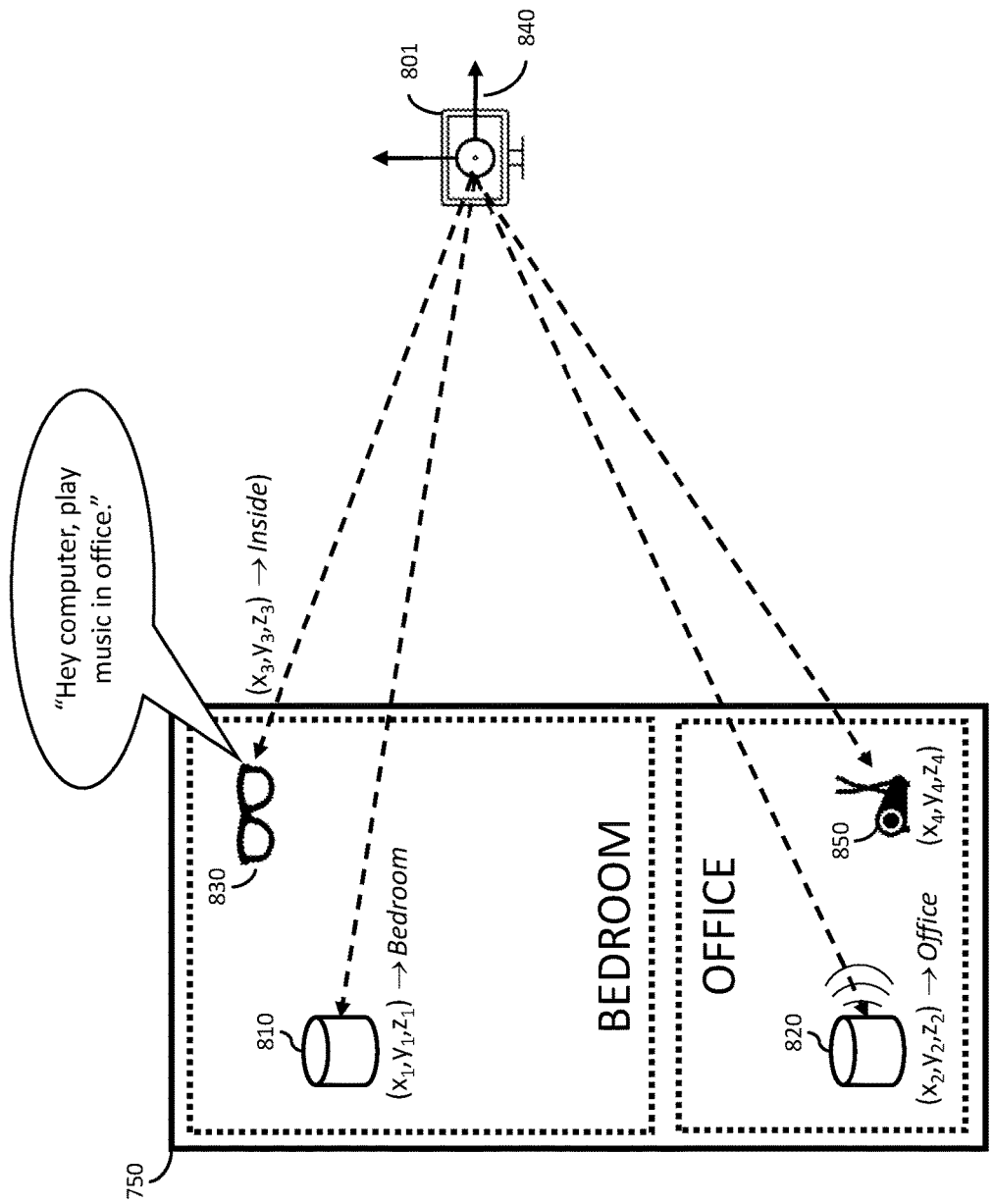
FIG. 8 illustrates a possible application using a merged 3D map from the 3D scanning scenario illustrated in FIG. 4.

FIG. 8 illustrates a possible application of a merged 3D map from the 3D scanning scenario illustrated in FIG. 4. While the application shown will be described in detail to explain aspects of the disclosure, obvious variations to this application, as well as other possible applications, may be understood as being within the scope of the disclosed technology.

As shown in FIG. 8, the first smart device (e.g., smart-home hub 801) located at the first anchor position tracks the positions of (or receives positions from) a plurality of smart devices. The plurality of smart devices shown include a first smart speaker 810, a second smart speaker 820, and a pair of AR glasses 830 (worn by a user). Each smart device may track itself or be tracked to obtain its position relative to the smart-home hub 801. For example, indoor positioning using UWB may determine that the first smart speaker 810 is at a first position (x1, y1, z1), the second smart speaker 820 is at a second position (x2, y2, z2), and the pair of AR glasses 830 (worn by a user) is at a third position (x3, y3, z3). Each determined position is relative to a coordinate system 840 that is based on the first anchor position at which the smart-home hub 801 is located.

The determined positions may be compared to the merged 3D map 750. Further, the determined positions may be compared to the additional information determined by tagging. For example, the application may conclude that the first smart speaker 810 is in the bedroom and the second smart speaker 820 is in the office based on a comparison of the first position and the second position to the tagged areas (i.e., BEDROOM, OFFICE) in the merged 3D map 750. The merged 3D map 750 may also help to define boundaries of the indoor space. For example, because the third position is within an area defined by the merged 3D map, the application may also conclude that the AR glasses 830 (worn by a user) are inside the boundaries of the indoor space.

The application may use the concluded locations of the smart devices to affect how they operate. For example, because the AR glasses 830 were concluded to be inside the boundaries of the indoor space, the application can provide function (i.e., access) to a user automatically, so that when the user says, "Hey computer, play music in the office." that command is carried out. In other words, the tracking relative to the merged 3D may be used to provide a measure of security to an application. To carry out the command, the application may configure the second smart speaker 820 to play music based on its location in the office. The first smart speaker 810 is configured to remain silent based on its location in the bedroom.

Besides areas, a particular location in the merged 3D map may be tagged based on a recognized object. As shown, a fourth location (x4, y4, z4) can be tagged based on an object (e.g., exercise machine 850) recognized at that position. An application tracking a smart device relative to the merged 3D map 750 may configure the smart device to change function (e.g., start/stop a process) when the smart device is moves close to (e.g., ≤1 meter) the object. For example, when the AR glasses 830 (i.e., the user) moves close to the exercise machine 850, statistics from a previous workout may be displayed on an AR display of the AR glasses.

Figure 9:
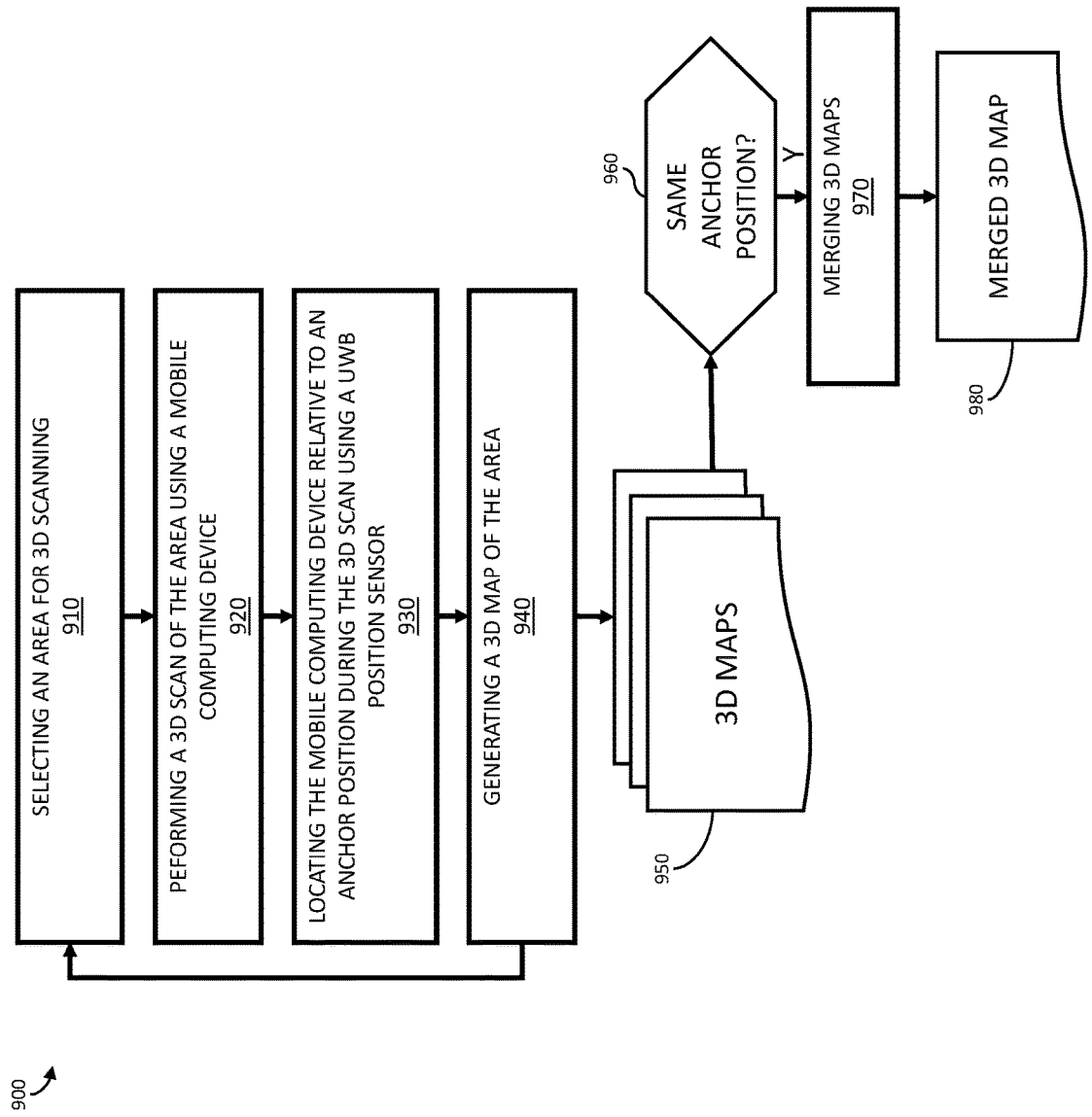
FIG. 9 is a flowchart of a method for generating a merged 3D map according to a possible implementation of the present disclosure.

FIG. 9 is a flowchart of a method for generating a merged 3D map according to a possible implementation of the present disclosure. The method 900 includes selecting 910 an area for scanning. The selecting can include positioning a mobile computing device within an area of an indoor space for scanning. The method further includes performing 920 a 3D scan of the area (e.g., room) using a mobile computing device. The 3D scan can include moving the mobile computing device as sensors (e.g., depth sensors, cameras, IMU) capture information about the area and the mobile computing device. The method further includes locating 930 the mobile computing device relative to an anchor position during the 3D scan using a UWB position sensor (e.g., of the mobile computing device). The locating can include computing a range and/or angle between the mobile computing device and a smart device configured for UWB and located at the anchor position using UWB signals. The method further includes generating 940 a 3D map of the area. The 3D map can include 3D points that are relative to a coordinate system based on the anchor position (e.g., the anchor position is the origin of the coordinate system). This process may be repeated to generate a collection 950 (i.e., set) of 3D maps. The method further includes merging 970 3D maps having the same anchor position 960 to form a merged 3D map 980.

Figure 10:
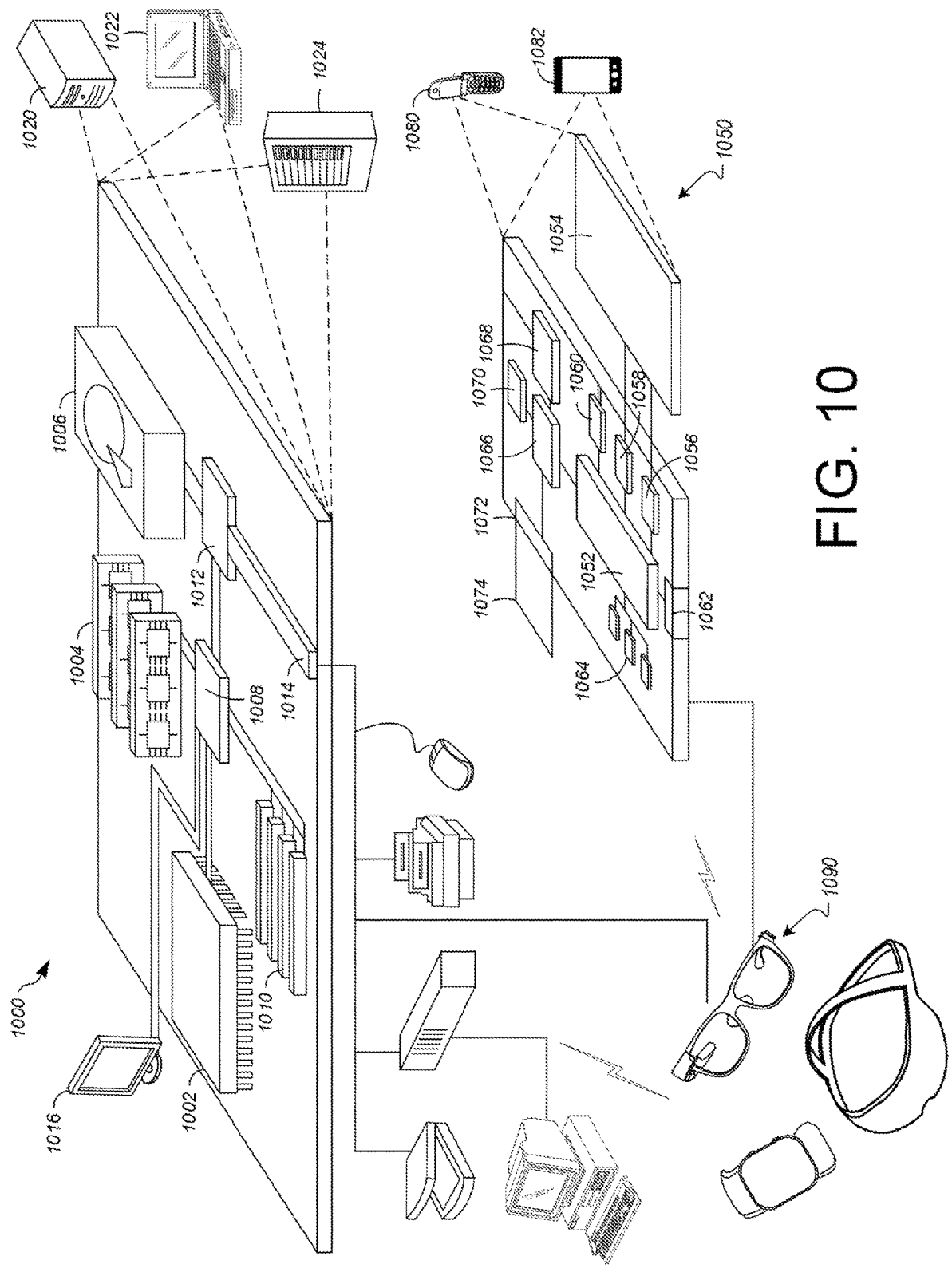
FIG. 10 illustrates an example computing environment, which may be used with the techniques described here.

FIG. 10 illustrates an example of a computer device 1000 and a mobile computer device 1050, which may be used with the techniques described here (e.g., to implement the mobile computing device, the smart device, the AR device etc.). The computing device 1000 includes a processor 1002, memory 1004, a storage device 1006, a high-speed interface 1008 connecting to memory 1004 and high-speed expansion ports 1010, and a low-speed interface 1012 connecting to low-speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high-speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low-speed controller 1012 manages lower bandwidth-intensive operations. Such allocation of functions is example only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display), and LED (Light Emitting Diode) or an OLED (Organic Light Emitting Diode) display, or other appropriate display technology. The display interface 1056 may include appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In-Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 1090 to generate an augmented environment for viewing inserted content within the physical space. For example, one or more sensors included on a computing device 1050 or other computing device depicted in the figure, can provide input to the AR headset 1090 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the AR space that can then be used as input to the AR space. For example, the computing device 1050 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 1050 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the AR space can cause a particular action to occur in the AR space.

In some implementations, a touchscreen of the computing device 1050 can be rendered as a touchpad in AR space. A user can interact with the touchscreen of the computing device 1050. The interactions are rendered, in AR headset 1090 for example, as movements on the rendered touchpad in the AR space. The rendered movements can control virtual objects in the AR space.

In some implementations, one or more output devices included on the computing device 1050 can provide output and/or feedback to a user of the AR headset 1090 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the AR space. In the example of the laser pointer in an AR space, the computing device 1050 appears as a virtual laser pointer in the computer-generated, 3D environment. As the user manipulates the computing device 1050, the user in the AR space sees movement of the laser pointer. The user receives feedback from interactions with the computing device 1050 in the AR environment on the computing device 1050 or on the AR headset 1090. The user's interactions with the computing device may be translated to interactions with a user interface generated in the AR environment for a controllable device.

In some implementations, a computing device 1050 may include a touchscreen. For example, a user can interact with the touchscreen to interact with a user interface for a controllable device. For example, the touchscreen may include user interface elements such as sliders that can control properties of the controllable device.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The invention claimed is:

1. A method for generating a three-dimensional (3D) map, the method comprising:
performing a first scan of a first area using a depth sensor of a mobile computing device;
locating the mobile computing device relative to an anchor position during the first scan using an ultra-wideband position sensor of the mobile computing device;
generating a first 3D map of the first area, the first 3D map relative to the anchor position performing a second scan of a second area using the depth sensor of the mobile computing device;
locating the mobile computing device relative to the anchor position during the second scan using the ultra-wideband position sensor of the mobile computing device;
generating a second 3D map of the second area, the second 3D map relative to the anchor position; and
merging the first 3D map and the second 3D map based on the anchor position.

2. The method according to claim 1, wherein:
the first area is a first room in a building or residence and the second area is a second room in a building or residence.

3. The method according to claim 2, wherein:
the anchor position is a location of a smart device fixedly positioned in the building or residence, the smart device configured for ultra-wideband communication.

4. The method according to claim 3, wherein:
the anchor position is a location of a smart device fixedly positioned outside the building or residence, the smart device configured for ultra-wideband communication.

5. The method according to claim 1, wherein merging the first 3D map and the second 3D map based on the anchor position includes:
spatially arranging the first 3D map and the second 3D map to form a third 3D map covering both areas.

6. The method according to claim 1, wherein the depth sensor is a lidar sensor, a camera, or an ultrasonic sensor.

7. The method according to claim 1, wherein the mobile computing device is a mobile phone, a tablet, or augmented-reality glasses.

8. The method according to claim 1, wherein the ultra-wideband position sensor is an ultra-wideband tag.

9. The method according to claim 8, wherein the locating the mobile computing device relative to a fixed position includes:
determining a range between the ultra-wideband tag and a smart device configured for ultra-wideband communication with the ultra-wideband tag, the smart device located at the anchor position.

10. The method according to claim 8, wherein the locating the mobile computing device relative to a fixed position includes:
determining ranges between the ultra-wideband tag and a plurality of smart devices configured for ultra-wideband communication with the ultra-wideband tag, one of the plurality of smart devices located at the anchor position.

11. A method for controlling an operation of a smart device based on its location, the method comprising:

generating a merged 3D map including a first area and a second area scanned by a mobile computing device, the first area and the second area located in the merged 3D map according to their relative positions to an anchor position, the relative positions determined by ultra-wideband (UWB) communication;

tagging a plurality of locations in the merged 3D map;

tracking the smart device based on UWB communication and the merged 3D map;

determining that the smart device is at a tagged location in the merged 3D map; and adjusting the operation of the smart device based on the tagged location.

12. The method according to claim 11, wherein the tagging the plurality of locations in the merged 3D map includes:

identifying boundaries of a building or residence based on the merged 3D map; and tagging a location outside the boundaries of the building or residence.

13. The method according to claim 12, wherein the adjusting the operation of the smart device based on the tagged location includes:

limiting access of the smart device to a network when the smart device is in the location outside the boundaries of the building or residence.

14. The method according to claim 11, wherein the tagging the plurality of locations in the merged 3D map includes:

identifying an object based on images correlated with the merged 3D map; and tagging an area surrounding the object.

15. The method according to claim 14, wherein the adjusting the operation of the smart device based on the tagged location includes:

presenting information regarding the object on the smart device when the smart device enters the area surrounding the object.

16. The method according to claim 11, wherein the tagging the plurality of locations in the merged 3D map includes:

identifying a room based on the merged 3D map; and tagging the room.

17. The method according to claim 16, wherein the adjusting the operation of the smart device based on the tagged location includes:

controlling a playback of media on the smart device based when the smart device enters the room.

18. The method according to claim 16, wherein the tagging the room includes:

identifying objects in the room based on images correlated with the merged 3D map;

determining a room-type based on the objects in the room; and tagging the room according to the room-type.

19. A system for generating a three-dimensional (3D) map, the system comprising:

a smart device fixedly located at an anchor position and configured for ultra-wideband (UWB) communication; and a mobile computing device including:

a depth sensor configured to gather a first set of depth data corresponding to a first area when the depth sensor is scanned over the first area during a first scan and a second set of depth data corresponding to a second area when the depth sensor is scanned over the second area during a second scan;

a UWB tag configured to determine ranges between the mobile computing device and the anchor position during the first scan and the second scan based on UWB communication between the smart device and the UWB tag; and a processor configured by software instructions to:

register the first set of depth data to the anchor position based on the ranges between the mobile computing device and the anchor position during the first scan;

generate a first 3D map relative to the anchor position based on the registered first set of depth data;

register the second set of depth data to the anchor position based on the ranges between the mobile computing device and the anchor position during the second scan;

generate a second 3D map relative to the anchor position based on the registered second set of depth data; and merge the first 3D map and the second 3D map.

20. A method for generating a three-dimensional (3D) map, the method comprising:

performing a first scan of a first area using a depth sensor of a mobile computing device;

locating the mobile computing device relative to an anchor position during the first scan using an ultra-wideband tag of the mobile computing device, wherein the locating includes determining a range between the ultra-wideband tag and a smart device located at the anchor position, the smart device configured for ultra-wideband communication with the ultra-wideband tag; and generating a first 3D map of the first area, the first 3D map relative to the anchor position.

* * * * *

UNITED STATES PATENT AND TRADEMARK OFFICE
CERTIFICATE OF CORRECTION

| | |
|---|---|
| PATENT NO. | : 11,585,917 B1 |
| APPLICATION NO. | : 17/445751 |
| DATED | : February 21, 2023 |
| INVENTOR(S) | : Wu et al. |

It is certified that error appears in the above-identified patent and that said Letters Patent is hereby corrected as shown below:

On the Title Page

Column 2, Item (74), in "Attorney, Agent or Firm", Line 1, delete "Baker" and insert -- Brake --, therefor.

Signed and Sealed this
Third Day of October, 2023

*Katherine Kelly Vidal*

Katherine Kelly Vidal
*Director of the United States Patent and Trademark Office*